ELECTRICAL COMMUNICATION SWITCHING NETWORK

Original Filed Nov. 16, 1970 2 Sheets-Sheet 1

INVENTOR
R. R. LAANE
BY
William H. Hauptman
ATTORNEY

ELECTRICAL COMMUNICATION SWITCHING NETWORK

Original Filed Nov. 16, 1970 2 Sheets-Sheet 2

United States Patent Office

Re. 27,798
Reissued Oct. 30, 1973

27,798
ELECTRICAL COMMUNICATION SWITCHING NETWORK

Rein Raymond Laane, Wheaton, Ill., assignor to Bell Telephone Laboratories, Incorporated, Murray Hill, N.J.

Original No. 3,655,920, dated Apr. 11, 1972, Ser. No. 89,599, Nov. 16, 1970. Application for reissue Sept. 1, 1972, Ser. No. 285,824
Int. Cl. H04q *3/50*
U.S. Cl. 179—18 GF 21 Claims

Matter enclosed in heavy brackets [ ] appears in the original patent but forms no part of this reissue specification; matter printed in italics indicates the additions made by reissue.

ABSTRACT OF THE DISCLOSURE

A communication switching network having semiconductor crosspoint elements defining unbalanced transmission paths therethrough wherein the effects of loss variations and crosstalk are substantially reduced by deliberately mismatching the impedances at opposite ends of each crosspoint path as seen from the crosspoint so that signal transmission through the crosspoint involves relatively large current variations with only very small voltage variations.

BACKGROUND OF THE INVENTION

The invention is concerned generally with communication switching systems and more particularly with communication switching systems in which unbalanced transmission paths are employed.

A substantial part of every communication switching system comprises transmission paths individually associated with the communication lines served by the system and switching networks for selectively interconnecting these paths. The term communication switching systems, as employed herein, includes telephone switching systems (both those systems employing analogue information transmission and those systems employing digital information transmission), telegraph switching systems, and data switching systems. Historically, large communication switching systems have employed space division switching networks utilizing balanced transmission paths through metallic crosspoints. Metallic crosspoints are well suited to communication switching systems since they generally exhibit long life and consistently low contact resistance and, because they are isolated electrically from their operating mechanisms, are particularly well adapted to use with balanced transmission paths. Balanced transmission paths are generally employed in such systems in order to minimize both capacitive and inductive crosstalk between paths. Metallic crosspoints tend, however, to be bulky, and to be generally slow to close and release. Use of balanced transmission paths through the crosspoints tends, furthermore, to be economically disadvantageous in that it doubles the number of crosspoints required.

In recent years, a number of solid-state or semiconductor switching devices, of which the thyristor is one of the more recent, have been developed for possible use as crosspoints in communication switching systems. Such devices offer significant advantages over metallic crosspoints from the standpoints of size, speed and cost. Other properties have, however, heretofore limited their application to relatively small switching systems. One of these properties is an impedance when the semiconductor crosspoint is in its "on" or conducting state which tends, in comparison with that of a metallic crosspoint, to be both large and variable. Such an "on" impedance characteristic is undesirable because it introduces both loss and loss variation to signals transmitted through the switching system. The other property is a relatively large capacitance when the semiconductor crosspoint is in its "off" or nonconducting state. Such an "off" capacitance is undesirable in a communication switching system because it adds still more to the capacitive coupling between transmission paths and thus further accentuates the crosstalk problem. In addition, because semiconductor crosspoints are generally not electrically isolated from their operating circuits, it is more difficult to overcome capacitive and inductive crosstalk by the past practice of using balanced transmission paths.

Heretofore, the line circuits and trunk circuits associated with communication switching systems have been connected directly to the switching system's terminals and transmission through the crosspoints has been between transmission paths exhibiting substantially identical impedance characteristics. The output impedance of a circuit connected to the input terminals of the transmission path through the crosspoints and the input impedance of a circupit connected to the output terminals of the transmission path through the crosspoints have, in other words, been substantially matched. While such arrangements minimize signal reflections and are particularly tolerant of paths which approach significant fractions of the wavelength of the highest transmitted signal frequency in length, they are particularly subject to crosstalk when employed either with semiconductor crosspoints or with unbalanced transmission paths.

It is accordingly one object of this invention to overcome limitations inherent in semiconductor devices when employed as crosspoints in communications switching networks.

Another object of this invention is to reduce the effects of loss variations in and crosstalk between conducting paths in semiconductor switching networks.

A further object of this invention is to improve noise and crosstalk characteristics of unbalanced switching networks.

It is also an object of this invention to achive a new and improved telecommunications switching network.

SUMMARY OF THE INVENTION

In accordance with the present invention, past problems associated with the use of semiconductor switching devices as crosspoints in large-scale communication switching systems and with unbalanced transmission paths through the crosspoints are overcome by deliberately and drastically mismatching the impedances at opposite ends of each crosspoint transmission path (as seen from the crosspoint) in such a manner that signal transmission through the crosspoint, instead of taking the form of normal current and voltage variations, involves relatively large current variations but only very small voltage variations. In particular, a coupling network is provided between the input transmission path and the crosspoint which presents to the crosspoint an impedance which is large in comparison with the impedance of the input and output transmission paths and a coupling network is provided between the crosspoint and the output transmission path which presents to the crosspoint an impedance which is small in comparison with the impedance of the input and output transmission paths. Because of the resulting division of voltages, transmission sensitivity to crosspoint impedance is drastically reduced and isolation from inductive crosstalk is significantly improved. At the same time, because of the greatly reduced voltage variations, capactive crosstalk from both crosspoint capacitance and normal capacitive coupling between transmission paths is similarly lessened.

In at least one important embodiment of the invention, transistor coupling networks are used at opposite ends of the transmission path through the semiconductor crosspoint to provide the required impedance transformations. At the input of the crosspoint, the coupling network takes the form of a transistor stage of either the emitter follower or the common-base configuration, presenting an output impedance of the collector to the crosspoint which is much higher than the impedance of the input and output transmission paths. At the output of the crosspoint, the coupling network takes the form of a transistor stage of the common-base configuration, presenting an input impedance of the emitter to the crosspoint which is much lower than the impedance of the input and output transmission paths. Both coupling networks advantageously use transistors of like conductivity type, so that the emitter current of the output network passes through the crosspoint and forms the collector current of the input network.

It is thus one feature of this invention that a calculated mismatch is introduced between the impedances at the input and output terminals of an unbalanced semiconductor switching network with the result that signal transmission therethrough is accomplished by large current variations as compared to small voltage changes. As a result of the relatively small voltage changes, capacitive and inductive crosstalk between the crosspoint conducting paths as well as signal distortion due to crosspoint nonlinearities are reduced. Isolation to ground noise in the unbalanced paths is also substantially improved.

According to another feature of this invention, transmission paths through an unbalanced switching network may be substantially extended. By adding impedance isolating transistors in the paths, segments thereof may be effectively buffered from the network paths on either side.

BRIEF DESCRIPTION OF THE DRAWING

The foregoing and other objects and features of this invention will be better understood from a consideration of the detailed description of illustrative embodiments thereof which follow when taken in conjunction with the accompanying drawing in which.

DETAILED DESCRIPTION

Figure 1:
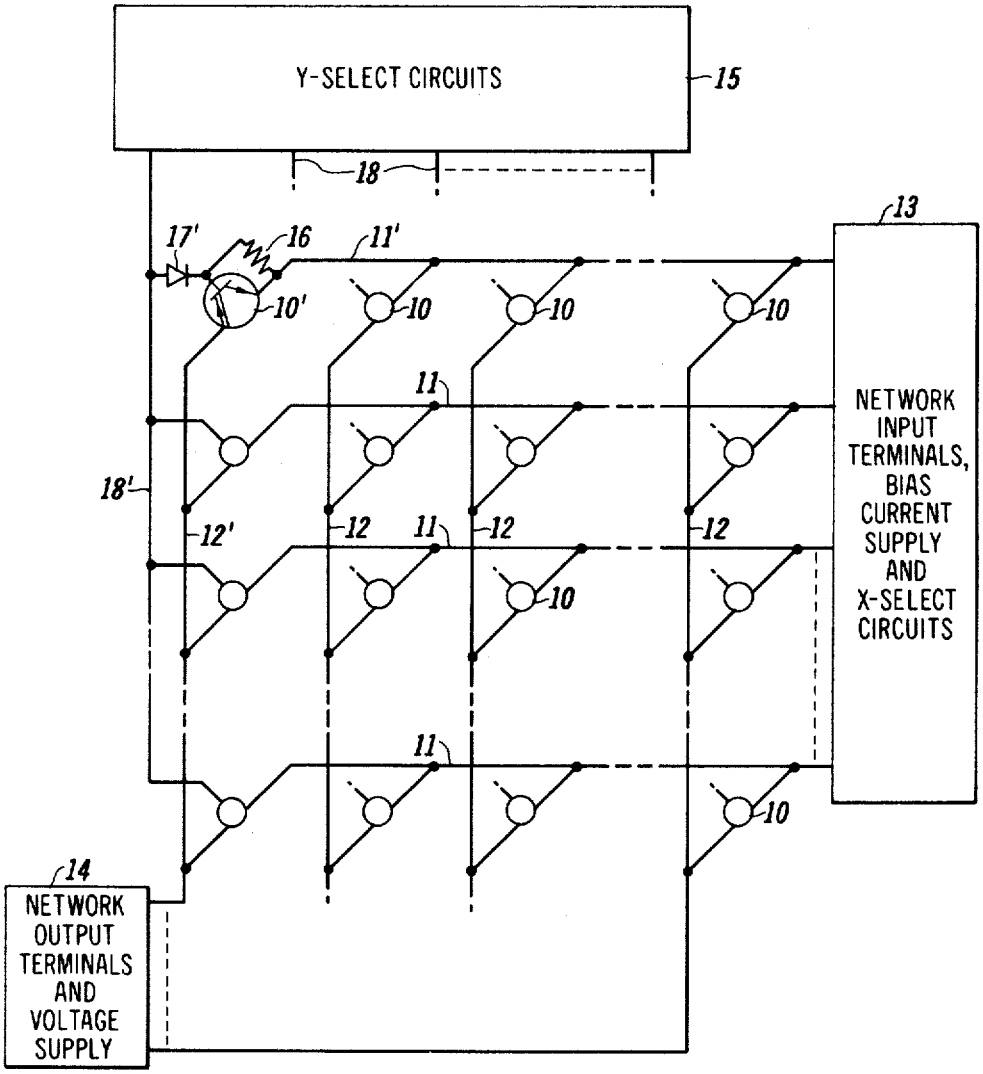
FIG. 1 depicts in simplified form an illustrative semiconductor switch of a network to which the principles of this invention are advantageously applicable, only a representative crosspoint being shown in detail.

A semiconductor crosspoint array comprising the basic switch of a switching network according to the present invention is shown in FIG. 1 and comprises a plurality of coordinately arranged semiconductor elements such as, for example, PNPN thyristors 10, a representative thyristor 10' of which is detailed in the figure. The thyristors 10 have their anodes and cathodes connected between horizontal and vertical conductors 11 and 12 of the switch at their intersections thereby providing in a conventional manner a single conducting path between each horizontal conductor 11 and any one of the vertical conductors 12. Inputs and outputs to the switch are provided at one end of each of the conductors 11 and 12 and comprise, at the input end, network input terminals, bias current supply and x-select circuits 13 and, at the output end, network output terminals and voltage supply 14. It will be appreciated that a switching network of the character contemplated herein may comprise a number of switches such as the switch of FIG. 1 for completing transmission paths therethrough from one of a number of input transmission lines connected to the line terminals 13 to one of a number of output transmission lines connetced to the network output terminals 14 of the last switch of the last stage of the network system. Since the details of the connection of the input and output transmission lines and the interconnection of the switch stages are well known in the art and, in any event, are not essential to a complete understanding of this invention, they are represented by block symbols only.

In a typical semiconductor switch under consideration, selection of a single crosspoint for defining a conducting path therethrough is conventionally accomplished on an x–y basis, although only the horizontal conductors 11 are directly controlled for selection. The particular selection mode here employed is based on the characteristics of the PNPN thyristor assumed as the crosspoint element. This element is rendered conductive and switched to its "on" state by a gating pulse applied to its base and remains conductive as long as a biasing current is passed through if of a magnitude greater than a predetermined threshold level. Once the bias current falls below this level, the thyristor element is returned to its "off" state. In accordance with this operation, the switch of FIG. 1 provides a plurality of bias current circuits, each including a horizontal conductor 11, a crosspoint element 10, and a vertical conductor 12, each of the horizontal conductors connected to a bias current supply which is understood to be included in the circuitry 13. Such current supplies are readily devisable by one skilled in the art and are accordingly not shown in detail in FIG. 1. The bias current circuits thus traced are selectively controlled by suitable *x*-select circuitry 13 under the ultimate supervision of network control circuits, not shown in the drawing, of the communication system with which the network of this invention may be adapted for use.

The vertical output conductors 12 are selected by y-select circuits 15 which apply the gating pulses to the crosspoint thyristors 10 via a plurality of gating conductors 18. The latter are arranged in columns so that all of the thyristors 10 of a column simultaneously receive a gating pulse from circuits 15. An exemplary conducting path through the switch is established by completing the biasing circuit for one of the horizontal conductors 11 under the control of x-select circuits 13, for example, for the conductor 11'. At the same time a gating voltage pulse is applied by the y-select circuits 15, also under the control of network control circuits mentioned earlier, via conductor 18' to the bases of the thyristors of the column including the thyristor 10' associated with the vertical conductor 12', for example. Thus, although each of the other thyristors of that column receive a gating pulse, current will be present only in the coordinate conductors 11' and 12' defined by the crosspoint 10'. The thyristor 10' remains conductive and the path thus defined remains active after the termination of the y-select gating pulse applied to its base as long as the current appearing in the path remains above the aforementioned threshold biasing level. Resistor 16' increases thyristor protection against false "turn-on" due to transient voltages. A diode 17' is added in series to each thyristor base for isolation purposes. Because of the absence of a biasing current in the nonselected paths defined by the remaining thyristors 10 associated with the vertical conductor 11', these semiconductor elements are not activated by the y-select voltage gating pulse.

The characteristics of a typical present day semiconductor crosspoint element limits the advantages of a network switch such as that depicted in FIG. 1 and described in the foregoing over a switch employing metallic contacts. Typically, semiconductor devices display a relatively high and variable impedance when in the conducting state (on the order of 10 to 20 ohms) and a relatively large capacitance when nonconducting (on the order of 2 picofarads) as compared to essentially zero (milliohms) closed impedance and infinite open impedance (capacitance less than 0.1 picofarad) of metallic contacts employed in balanced networks. Semiconductor switch "on" impedance and "off" capacitance serve to introduce loss and loss variations to signals transmitted through the network and causes excessive crosstalk between active network conducting paths. These problems are overcome and other advantages achieved in one illustrative embodiment of this invention the principles of which are demonstrated by the alternating equivalent circuit depicted in FIG. 2. A switching network 20, within which it is assumed that one or more semiconductor crosspoints have been selected to establish a single conducting path, connects one of a plurality of input circuits 21 with one of a plurality of output circuits 22. This connection is made at either side of the network via a pair of impedance coupling NPN transistors 23 and 24. The circuits 21 and 22 in the context of a communications switching system may comprise input and output transmission lines or trunks. Common-base transistors 23 and 24 together with resistors 25 and 26, respectively, comprise impedance convertors. To simplify the circuit, sources of biasing current for the semiconductor crosspoints of the network 20 referred to in connection with the switch of FIG. 1 have been omitted. To facilitate an understanding of the circuit of FIG. 2, idealized transistor characteristics of zero emitter impedance, infinite collector impedance, and unity common-base current gain, $\alpha$, will be assumed which in practice may very nearly be achieved as will be demonstrated hereinafter. It is further assumed that each of the input and output circuits presents to the convertors 23 and 24 a typical impedance of 600 ohms.

Voltage signals E, transmitted from an input transmission line of input circuits 21 are applied across the emitter and base of transistor 23 and across input resistor 25 and are converted into emitter current changes $I_1$ as a function of the input signal level and the value $R_{01}$ of resistor 25, where $$I_1=E_i/R_{01} \qquad (1)$$

The emitter current changees $I_1$ produce collector current changes $I_2$ in transistor 23 which are transmitted through the network and are received at the network output and the emitter of impedance convertor transistor 24 and are conducted therethrough as collector output current $I_3$. As a result of the unity gain of transistors 23 and 24, their zero emitter impedances and their infinite collector impedances, $I_1=I_2=I_3$. Normal voltage and current levels $E_o$ and $I_3$ are recovered across output resistor 26 having the value $R_{02}$, where $$E_o=I_3R_{02} \qquad (2)$$

Since $I_1=I_3$, substituting from (1) above, then $$\left[E_o=\frac{E_iR_{02}}{17R_{01}}\right] E_o=\frac{E_iR_{02}}{R_{01}} \qquad (3)$$

Since the network is driven by a high impedance source (infinite in the foregoing equivalent circuit) any crosspoint impedance will not force changes in the transmitted signal level. Further, since the transmission path through the network is terminated in a low output impedance (zero in the foregoing example), any voltage changes produced in the network path are caused by the crosspoint impedance. It can be shown that capacitive crosstalk isolation between two network paths within the network 20 can be computed from the relationships $$\text{crosstalk isolation}=(I_x/I_d)\approx 2\pi fC_{eq}R_{eq} \qquad (4)$$

or $$\text{crosstalk isolation (dB)}=$$

$$20\ \log_{10}(I_x/I_d)\approx 20\ \log_{10}2\pi fC_{eq}R_{eq} \qquad (5)$$

where $I_x$ is the crosstalk signal coupled into the disturbed path from disturber $I_d$, f is the frequency of the signal, $C_{eq}$ is the equivalent capacitance between the disturbing and the disturbed signal path, and $R_{eq}$ is the equivalent series impedance of the disturbing path.

Figure 3:
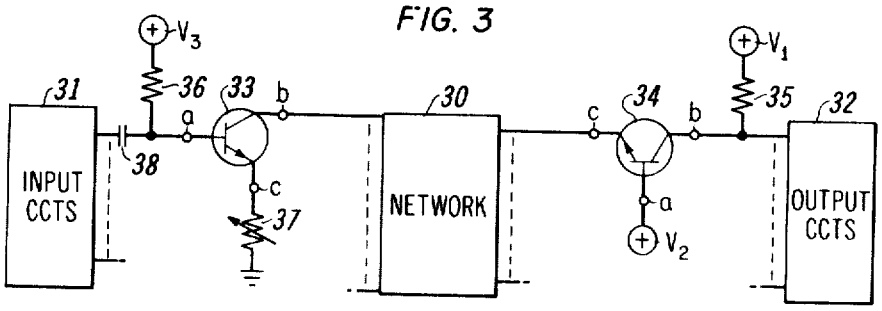
FIG. 3 depicts a variation of the network shown in FIG. 2.

Another advantageous network arrangement according to this invention, shown in FIG. 3, provides for a convenient adjustment of network gain. In this embodiment provision is also made for supplying the biasing current necessary to maintain the semiconductor crosspoints of the network path conductive. The semiconductor network selectively establishes connections between input and output circuits 31 and 32 via a pair of NPN transistors 33 and 34, respectively. The circuits 31 and 32 may again comprise input and output transmission lines or trunks of the system with which the network of this invention is associated. The transistors 33 and 34, connected respectively in the emitter follower and common-base modes, provide the impedance convertor couplings at the input and output terminals of the networks. The transistor 33 also acts as a current source for providing the bias for the crosspoint semiconductors of the network 30. A voltage source $V_1$ applied across resistor 35 to the collector of transistor 34 holds the latter in its active state and supplies the bias current through resistor 35 to the semiconductor crosspoints of network 30. A voltage source $V_2$ connected to the base of transistor 34 positively biases the thyristor crosspoints and, by reverse biasing the base-to-collector junction of transistor 33, holds that element in its active state. A third voltage source $V_3$ connected through a resistor 36 to the base of transistor 33 serves as a reference potential to determine the level of the bias current flowing through resistor 37 to ground and therefore determines the current flowing through the semiconductor crosspoints of network 30. The latter resistor, connected between the emitter of transistor 33 and ground, is conveniently variable to provide gain control. Capacitor 38 provides necessary direct current isolation for the bias voltage on the base of transistor 33 from the input circuits 31.

In the arrangement of FIG. 3, information signals received from the input circuits 31 are applied to the impedance coupling transistor stage 33 to vary about the reference potential set by $V_3$ and determining the crosspoint biasing current level. The latter transistor stage thus serves as a current modulator for the input signals to be transmitted through the network. The biasing current is maintained at a level sufficient to hold active crosspoints conductive for all negative swings of the input signals. At the other end of the network, transistor stage 34 acts as a demodulator for returning the information to the original signal form for application to the output circuits 32.

Figure 2:
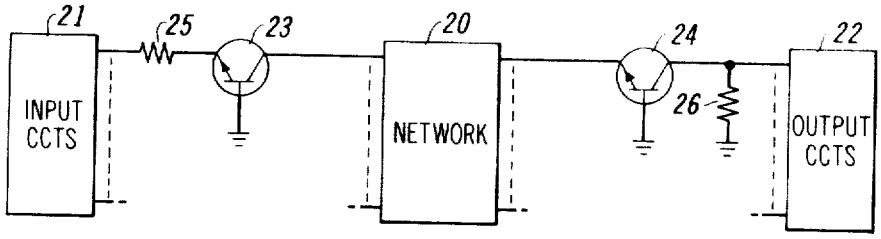
FIG. 2 is the alternating current equivalent circuit of an illustrative network arrangement according to this invention.

Again assuming the ideal transistor characteristics of the embodiment of FIG. 2, the advantages of the arrangement of FIG. 3 will be apparent. Considering only input signal current variations received from circuits 31, input voltage signals $E_1$ transmitted from the transmission lines of circuits 31 are applied to the base of transistor 33. The voltage changes appearing at the base also appear at the emitter. As a result, an emitter current change $I_2$ is produced as a function of $E_1$ and $R_1$, the latter being the value of resistor 37. Thus, $$I_2=E_i/R_1 \qquad (6)$$

The current change $I_2$ is transmitted through the semiconductor crosspoints of the network 30 and applied to the impedance convertor coupling transistor 34 where $$E_0=-I_2R_{02}=-E_i(R_{02}/R_1) \qquad (7)$$

$R_{02}$ being the value of the parallel combination of resistor 35 and the equivalent impedance of the output circuit 32. Gain or loss through the network is readily adjusted by varying the value $R_1$ of resistor 37.

Figure 4:
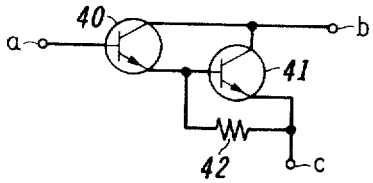
FIG. 4 depicts a Darlington transistor configuration advantageously applicable in practicing the network principles of this invention.

The ideal transistor circuit characteristics assumed in connection with the description of the equivalent circuits of this invention shown in FIGS. 2 and 3 are very nearly attainable by employing Darlington transistor configurations of the character depicted in FIG. 4. In that arrangement, a pair of NPN transistors 40 and 41 have their collectors and emitters connected together, the latter element being connected through a biasing resistor 42, the emitter of transistor 40 also being connected directly to the base of transistor 41. Terminal designations a, b, and c are supplied in the circuit of FIG. 4 to facilitate an understanding of its interconnection with the network arrangement of FIG. 3 where corresponding terminals are indicated. Assuming the connection of a circuit as depicted in FIG. 4 as substituted at the input and output ends of the network 30 for the transistor circuits 33 and 34 of FIG. 3 at the designated terminals, then the following values are apparent. Defining the common emitter current gains of transistors 40 and 41 substituted at the input end of network 30 of FIG. 3 at $\beta_1$ and $\beta_2$, respectively, then the composite gain of the Darlington circuit becomes the product $\beta_1\beta_2$. The base input impedance of transistor 40 is thus approximately $\beta_1\beta_2R_1$, where, it will be recalled, $R_1$ is the value of resistor 37, and the emitter input impedance at transistor 41 is approximately $r_e+R_{01}/\beta_1\beta_2$, where $r_e$ is the equivalent internal emitter impedance of the Darlington configuration of FIG. 4 and $R_{01}$ is the value of resistor 36. Typically, the composite $\beta$ for the Darlington circuit is greater than 1,000, $\alpha$ being greater than 0.999, the base of transistor 41. Terminal designations a, b, and understanding of its interconnections with the network at transistor 41 is approximately $r_e+R_{01}/\beta_1\beta_2$, where $r_e$ pedance is approximately 6 ohms, applicable to both the Because of nearly unity common base current gain of the Darlington circuits, it is possible to insert additional transistors in the network path as impedance isolators without introducing appreciable changes in the recovered transmission levels. The ability to isolate segments of a network path from each other makes it possible to achieve better network transmission characteristics and allows implementation of larger, wider bandwidth switching networks. In unbalanced networks, a larger network is possible when using impedance isolators because isolators will improve network crosstalk characteristics. Generally, the size of an unbalanced network is limited primarily by capacitive crosstalk which increases as the network size (and therefore the transmission path length through the network) increases. As described in the foregoing, capacitive crosstalk in a network according to this invention is a function of the equivalent series path impedance and the equivalent capacitance between network paths. It is difficult to prevent capacitive coupling from increasing as path length increases; however, by employing impedance isolators, it is possible to reduce the equivalent series resistance in the longer path segments.

Figure 5:
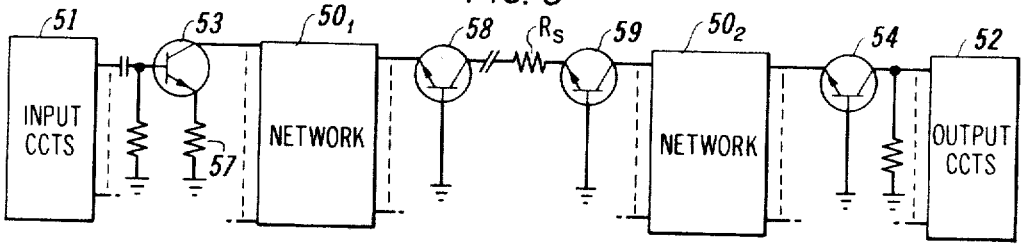
FIG. 5 is an alternating current equivalent circuit diagram of a switching network demonstrating the manner in which, according to this invention, larger networks may be implemented by the insertion within segments thereof of impedance isolators.

This is demonstrated in FIG. 5 by the alternating current equivalent of such a network arrangement there depicted. A pair of unbalanced networks $\mathbf{50_1}$ and $\mathbf{50_2}$, each including semiconductor crosspoint elements, are coupled to input and output circuits 51 and 52 by means of impedance converter transistors 53 and 54, respectively, in a manner similar to that described in connection with the equivalent circuit of FIG. 2. Impedance isolator transistors 58 and 59 buffer the connecting transmission cable path from networks $\mathbf{50_1}$ and $\mathbf{50_2}$. As noted hereinbefore, the equivalent series resistance within a network switch section is a function of both the impedance of the semiconductor c rosspoints in the section and the emitter impedance of the impedance converter transistor. However, since the equivalent series impedance of the cable path is primarily a function of the isolator emitter impedance, it is possible to transmit signals with improved crosstalk isolation on the sections containing no crosspoints as a result of the lower equivalent impedance of the path.

A further advantage of the impedance isolation circuits described in the foregoing is realized in wideband switching networks. In unbalanced networks capable of switching signals on the order of 3 megahertz, for example, path lengths within the network are generally maintained shorter than 10 feet to avoid signal reflection problems. To avoid this undue restriction on network path length, impedance isolators may be employed to extend this range. In wideband networks, long sections of the network paths may be isolated from the switching stages as depicted in FIG. 5. Transmission line reflections in the long sections may be avoided by terminating the path at the receiving end by adding a series resistance to the emitter of the isolator circuit, that is, a resistance $R_8$, connected to the emitter of transistor 59 in series with the cable.

What have been described are considered to be only exemplary embodiments of this invention and it is to be understood that various and numerous other arrangements may be devised by one skilled in the art without departing from the spirit and scope of this invention by the accompanying claims.

What is claimed is:

1. In a communication system, a plurality of input transmission lines and a plurality of output transmission lines, each of said input and output lines having a predetermined impedance, a switching network for selectively connecting said input and output lines comprising an array of semiconductor crosspoints defining a plurality of conducting paths through said network, said crosspoints presenting variable impedances when in the conducting state and having particular capacitances when in the nonconducting state, and means for reducing the effects of loss variations in said conducting paths and for reducing crosstalk between said conducting paths comprising first circuit means for coupling *a* selected one of said input transmission lines to one of said conducting paths, said first circuit means presenting an impedance to the crosspoint in said one of said conducting paths greater than said predetermined impedance of said selected input transmission line and second circuit means for coupling said one of said *conducting paths to a selected one of said* output transmission lines, said second circuit means presenting an impedance to the crosspoint in said one of said conducting paths less than the predetermined impedance of said last-mentioned output transmission line.

2. In a communication system, the combination according to claim 1 in which said first circuit means presents an impedance to the crosspoint in said one of said conducting paths many times greater than said predetermined impedance of said selected intput transmisison line and said second circuit means presents an impedance to the crosspoint in said one of said conducting paths many times less than the predetermined impedance of said selected one of said output transmission lines.

3. In a communication system, the combination according to claim 2 in which said semiconductor crosspoints comprise thyristors and in which said plurality of conducting paths through said network are unbalanced paths.

4. In a communication system, the combination according to claim 3 in which said first circuit means comprises a transistor stage presenting its collector impedance to said crosspoint in said one of said conducting paths and said second circuit means comprises a transistor stage presenting its emitter impedance to said last-mentioned crosspoint.

5. In a communication system, the combination according to claim 4 in which said first and said second circuit means comprise common-tmitter and common-base like conductivity type transistor stages, respectively, and the emitter current of said second circuit means passes through said crosspoint and constitutes the collector current of said first circuit means.

6. In a communication system, the combination according to claim 4 in which said first and said second circuit means each comprises a Darlington composite transistor circuit presenting the collector impedance of the output stage of one to said crosspoint in said one of said conducting paths and the emitter impedance of the input stage of the other to said last-mentioned crosspoint.

7. A communication system comprising a plurality of input transmission lines and a plurality of output transmission lines, each of said input and output lines having a predetermined impedance, a first switching network for selectively connecting transmission paths therethrough from said input transmission lines, a second switching network for selectively connecting transmission paths therethrough to said output transmission lines, each of said switching networks comprising an array of semiconductor crosspoints defining a plurality of said transmission paths therethrough, said crosspoints presenting variable impedances when in the conducting state and having particular capacitances when in the nonconducting state, means for reducing the effects of loss variations in said transmisison paths through said networks and for reducing crosstalk between said last-mentioned paths comprising first circuit means for coupling a selected one of said input transmission lines to one of said transmission paths through said first switching network, said first circuit means presenting an impedance to the crosspoints in said one of said transmission paths many times greater than said predetermined impedance of said selected input transmission line and second circuit means for coupling a selected one of said output transmission lines to one of said transmisison paths through said second switching network, said second circuit means presenting an impedance to the crosspoints in said last-mentioned transmission paths many times less than the predetermined impedance of said selected one of said output transmission lines; a plurality of conductor means for connecting said first and said second switching networks each having a predetermined impedance, and means for isolating said last-mentioned impedance and thereby reducing crosstalk between said conductor means comprising third circuit means for coupling said one of said transmission paths through said first switching network to one of said plurality of conductor means, said third circuit means presenting an impedance to the crosspoints in said one of said last-mentioned transmission paths many times less than said predetermined impedance of said selected input transmission line and fourth circuit means for coupling said one of said transmission paths through said second switching network to said one of said plurality of conductor means, said fourth circuit means presenting an impedance to the crosspoints in said last-mentioned transmission paths many times greater than said predetermined impedance of said selected output transmission line.

8. A communication system according to claim 7 in which said plurality of transmission paths through said first and said second switching networks and said plurality of conductor means connecting said first and said second switching networks each comprises an unbalanced line.

9. A communication system according to claim 8 in which said third and *said* fourth circuit means each comprises a like conductivity type, common-base transistor stage.

10. In a switching network employing a semiconductor switch for selectively coupling signals between input and output transmission paths each having a standard impedance, an arrangement for reducing the effects of loss variations through said semiconductor switch when it is in its conducting state and for reducing the amount of crosstalk with similar paths when said semiconductor switch is in its nonconducting state which comprises a first impedance network connected between said input path and said switch which presents an impedance to said switch many times greater than said standard impedance and a second impedance network connected between said switch and said output path which presents an impedance to said switch many times lower than said standard impedance.

11. In a communication system, a plurality of input transmission lines and a plurality of output transmission lines, each of said input and output transmission lines having a predetermined impedance, a switching network for selectively connecting said input and output lines comprising an array of thyristor crosspoints defining a plurality of conducting paths through said network, said crosspoints presenting variable impedances when in the conducting [stage] *state* and having particular capacitances when in the nonconducting state, means for activating the thyristor crosspoints of a selected one of said conducting paths through said network, a current source for providing a biasing current for the thyristor crosspoints in said last-mentioned conducting path, modulating means for modulating said biasing current in accordance with information signals on a selected one of said input transmission lines, and demodulating means for demodulating said biasing current and for applying said information signals to a selected one of said output transmission lines, said modulating means presenting an impedance to the crosspoints in said selected one of said conducting paths many times greater than said predetermined impedance of said selected input transmission line and said demodulating means presenting an impedance to the crosspoints in said selected one of said conducting paths many times less than the predetermined impedance of said selected output transmission line, whereby the effects of loss variations in said selected one of said conducting paths and crosstalk between paths of said plurality of conducting paths are substantially reduced.

12. In a communication system, the combination according to claim 11 in which each of said plurality of conducting paths through said network is an unbalanced line.

13. In a communication system, the combination according to claim 12 in which said modulating means comprises a common-emitter transistor stage and said demodulating means comprises a common-base transistor stage of a conductivity type like said common-emitter transistor stage.

14. A switching network for selectively establishing connections between a plurality of input transmission lines and a plurality of output transmission lines, each of said input and output transmission lines having a predetermined impedance, said network comprising an array of semiconductor crosspoints defining a plurality of unbalanced conducting paths therethrough, said crosspoints presenting variable impedances when in the conducting stage and having particular capacitances when in the nonconducting state, first circuit means for coupling a selected one of said input transmission lines to one of said conducting paths, said first circuit means presenting an impedance to the crosspoints in said last-mentioned conducting path many times greater than the predetermined impedance of said selected input transmission line, and second circuit means for coupling said one of said conducting paths to a selected one of said output transmission lines, said second circuit means presenting an impedance to the crosspoints in said last-mentioned conducting path many times less than the predetermined impedance of said selected output transmission line, whereby the effects of loss variations in said selected conducting path and crosstalk between paths of said plurality of conducting paths are substantially reduced.

15. A switching network according to claim 14 in which said semiconductor crosspoints each comprises a PNPN transistor and said first and second circuit means include means for providing a biasing current for said transistor crosspoints in said selected one of said conducting paths.

16. A switching network according to claim 15 in which said first circuit means comprises a transistor stage presenting a collector impedance to said transistor crosspoints in said selected conducting path and said second circuit means comprises a transistor stage presenting an emitter impedance to said last-mentioned transistor crosspoints.

17. A switching network according to claim 15 in which said array of crosspoints includes a first and a second section selectively interconnectable by a plurality of cable means, said cable means each including impedance isolator means comprising a first transistor stage at one end presenting an emitter impedance to the crosspoints of said first section of said array, a second transistor stage at the other end presenting a collector impedance to the crosspoints of said second section of said array.

*18. In a communication system, a plurality of input transmission lines and a plurality of output transmission lines, each of said input and output lines having a predetermined impedance, a plurality of conducting paths for interconnecting said input and output transmission lines, and means for reducing interference with signals in said conducting paths comprising first circuit means for coupling a selected one of said input transmission lines to one of said conducting paths, said first circuit means presenting an impedance to said one of said conducting paths greater than said predetermined impedance of said selected input transmission line and second circuit means for coupling said one of said conducting paths to a selected one of said output transmission lines, said second circuit means presenting an impedance to said one of said conducting paths less than the predetermined impedance of said last-mentioned output transmission line.*

*19. A switching network for selectively establishing connections between a plurality of input transmission lines and a plurality of output transmission lines, each of said input and output transmission lines having a predetermined impedance, said network comprising an array of crosspoints defining a plurality of unbalanced conducting paths therethrough, first circuit means for coupling a selected one of said input transmission lines to one of said conducting paths, said first circuit means presenting an impedance to the crosspoints in said last-mentioned conducting path many times greater than the predetermined impedance of said selected input transmission line, and second circuit means for coupling said one of said conducting paths to a selected one of said output transmission lines, said second circuit means presenting an impedance to the crosspoints in said last-mentioned conducting path many times less than the predetermined impedance of said selected output transmission line.*

*20. A switching network according to claim 19 in which said first circuit means comprises a transistor stage presenting a collector impedance to said crosspoints in said selected conducting path and said second circuit means comprises a transistor stage presenting an emitter impedance to said last-mentioned crosspoints.*

*21. A switching network according to claim 19 in which said array of crosspoints includes a first and a second section selectively interconnectable by a plurality of cable means, said cable means each including impedance isolator means comprising a first transitsor stage at one end presenting an emitter impedance to the crosspoints of said first section of said array, a second transistor stage at the other end presenting a collector impedance to the crosspoints of said second section of said array.*

References Cited

The following references, cited by the Examiner, are of record in the patented file of this patent or the original patent.

UNITED STATES PATENTS

| | | | |
|---|---|---|---|
| 3,629,513 | 12/1971 | Feiner | 179—18 GF |
| 3,688,051 | 8/1972 | Aagaard | 179—18 GF |
| 3,027,427 | 3/1962 | Woodin | 179—18 GF |
| 3,423,538 | 1/1969 | Gaunt | 179—18 BO |
| 3,576,950 | 5/1971 | Jovic | 179—18 GF |

THOMAS W. BROWN, Primary Examiner

U.S. Cl. X.R.

340—166

UNITED STATES PATENT OFFICE
CERTIFICATE OF CORRECTION

Patent No. Re. 27,798 Dated October 30, 1973

Inventor(s) Rein R. Laane

It is certified that error appears in the above-identified patent and that said Letters Patent are hereby corrected as shown below:

Column 2, line 20, "cupit connected to" should read --cuit connected to--. Column 4, line 5, "connetced to the" should read --connected to the--. Column 4, line 22, "through if of" should read --through it of--. Column 5, line 34, "Voltage signals E," should read --Voltage signals $E_i$--. Column 5, line 41, "emitter current changees" should read --emitter current changes--. Column 7, line 14, "at $\beta_1$ and" should read --as $\beta_1$ and--. Column 7, lines 24 through 27 are incorrect and should read --the base input impedance and collector impedance are each greater than 50 kilohms, and the emitter input impedance is approximately 6 ohms, applicable to both the input and output network impedance coupling circuits.--. Column 8, line 13, "this invention by" should read --this invention as defined by--. Column 8, line 63, "comprise common-tmitter" should read --comprise common-emitter--. Column 9, line 13, "said transmisison paths" should read --said transmission paths--. Column 9, line 23, "said transmisison paths" should read --said transmission paths--. Column 12, line 14, "first transitsor stage" should read --first transistor stage--.

Signed and sealed this 16th day of April 1974.

(SEAL)
Attest:

EDWARD M.FLETCHER,JR.
Attesting Officer

C. MARSHALL DANN
Commissioner of Patents